Figure 1:
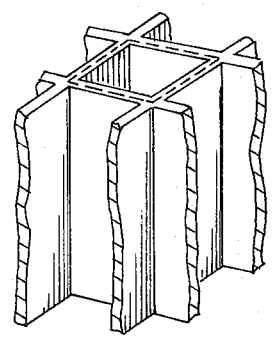

United States Patent [19]

Westerstrandh et al.

[11] 4,432,346
[45] Feb. 21, 1984

[54] SOLAR COLLECTOR

[76] Inventors: Björn V. Westerstrandh, Rotyxvägen 7, S-752 48 Uppsala; Arne V. Karlsson, Näckrosgatan 7C, S-754 37 Uppsala, both of Sweden

[21] Appl. No.: 268,986
[22] PCT Filed: Oct. 16, 1980
[86] PCT No.: PCT/SE80/00252
§ 371 Date: Jun. 17, 1981
§ 102(e) Date: Jun. 3, 1981
[87] PCT Pub. No.: WO81/01188
PCT Pub. Date: Apr. 30, 1981

[30] Foreign Application Priority Data
Oct. 17, 1979 [SE] Sweden .................................. 7908582

[51] Int. Cl.$^3$ .............................................. F24J 3/02
[52] U.S. Cl. .................... 126/445; 126/449; 165/170
[58] Field of Search ................. 165/166, 170; 126/441, 126/444, 445, 448, 449, 417, 450, 446

[56] References Cited
U.S. PATENT DOCUMENTS

| | | | |
|---|---|---|---|
| 574,157 | 12/1896 | Ljungstrom | 126/444 |
| 1,374,781 | 4/1921 | Thompson | 165/170 |
| 4,008,708 | 2/1977 | Hagarty | 126/445 |
| 4,019,496 | 4/1977 | Cummings | 126/449 |
| 4,026,268 | 5/1977 | Bartos | 126/445 |
| 4,084,574 | 4/1978 | Golay | 126/449 |
| 4,089,324 | 5/1978 | Tjaden | 126/444 |
| 4,098,262 | 7/1978 | Peters | 126/444 |
| 4,144,872 | 3/1979 | Harrison | 165/48 |
| 4,149,522 | 4/1979 | Keeling | 126/441 |
| 4,205,662 | 6/1980 | Rhodes | 165/170 |
| 4,211,213 | 7/1980 | Nissen | 165/170 |

FOREIGN PATENT DOCUMENTS 835522 4/1952 Fed. Rep. of Germany .
87313 7/1936 Sweden .

Primary Examiner—Daniel J. O'Connor
Attorney, Agent, or Firm—Bacon & Thomas

[57] ABSTRACT

A solar collector comprises a solar radiation absorbing surface, a transparent cover over but spaced from the absorbing surface, and a convection and heat radiation suppressing structure occupying at least part of the space between the absorbing surface and the transparent cover. The convection and heat radiating suppressing structure includes a self-supporting structure comprising at least two thin, corrugated transparent foils placed on top of each other in contiguous relationship such that they form a system of long narrow ducts between adjacent foils, the ducts extending substantially parallel to the absorbing surface. Provision is made for providing heat carrying fluid within the space between the absorbing structure, and the cover, including within the ducts between the foils.

9 Claims, 4 Drawing Figures

SOLAR COLLECTOR

The present invention relates to a solar collector having an improved radiation and convection-suppressing structure.

The heat losses from a planar or moderately concentrating solar collector mainly take place through the front surface or window of the solar collector, and may be separated into three different components, viz. radiation losses, convection losses and conduction losses. The losses through conduction as a rule are small and may often be neglected in comparison with the two others. Great efforts are therefore made to suppress heat losses through convection and radiation.

In order to reduce the radiation losses several transparent layers may be placed in front of the sunlight absorbing surface. Indeed, it is more difficult for the sunlight to pass, if the number of transparent layers are increased, but since the latter as a rule absorb the heat radiation from the sunlit and warm absorber, the radiation losses may be reduced to such an extent that they more than balance the transmission losses. Simultaneously the convection losses, i.e. the losses due to the air of gas flow between the absorber and the transparent layers, between the transparent layers, and between the outer layer and the surrounding, are decreased if the number of transparent layers in front of the absorber are increased.

The radiation losses may be further reduced, if the absorber is provided with a specific surface coating making the absorber surface radiate heat to a lesser extent than if the absorber is painted with "ordinary" black colour. Such so-called wavelength selective surfaces will, due to the low heat radiation emitted from the surface, be heated to much higher temperatures than a non-selective absorber surface. Since the temperature difference between the absorber surface and an above located glass, or equivalent, hereby is greater, the heat flow or convection is also increased, but the total heat losses at a certain temperature level are reduced with a selective absorber surface. The heat losses may also be reduced by coating the transparent layers in front of the absorber with a heat reflecting film which is transparent to sunlight. By combining the above described measures the heat losses can be minimized in a suitable manner. One must, however, always weigh these measures against their effect on the transmission and absorbed proportion of the incident sunlight.

An ideal plane solar collector could be described as having, in addition to a good insulation backwards and along the sides, a transparent sheeting of mineral wool in front of and in contact with the absorber as well as with an outer transparent plane layer, e.g. a glass pane. In such a way both heat radiation and convection losses from the absorber are efficiently prevented. Sufficiently transparent mineral wool sheetings do, however, not exist. As a substitute plastic or glass tube structures have been placed between and in direct contact with the absorber and the outer transparent cover, or only against the absorber without any outer cover, the tubes or cavities of said structures extending perpendicularly to the absorber and the outer glass or plastic window in parallel to the absorber. Such structures may have the form of a honeycomb like structure (see FIG. 1) which is placed on the absorber. An outer glass or plastic cover is then placed against the plane outer face of the honeycomb structure. Since the ducts, which thus extend from said window and essentially perpendicularly towards the absorber, are designed with a high ratio between the length and effective diameter of the ducts, typically greater than 5, the convection is efficiently suppressed. A complication is, however, that either the absorber or the outer transparent cover must connect closely against the convection suppressing structure to make the intended convection suppression efficient. Since the absorber usually is easier to manufacture and can be made more effective, if the liquid or gas filled heat transport ducts are placed centrally in the absorber, such that the tubes or ducts bulge or project on both sides of the absorber, an interspace to the structure is formed, which may have a thickness of up to half the tube or duct diameter. In such a case the convection suppressing structure must contact the outer transparent cover over the whole surface thereof, which necessitates very high requirements concerning flatness and parallelity of the absorber and outer transparent cover. Problems have also arisen with the heat resistance of the material of the honeycomb structure. Furthermore, obliquely incident sunlight must pass many duct walls of the convection suppressing structure, and a great portion of the solar energy is lost through absorption and reflection in such a structure.

The purpose of the present invention is to eliminate the above mentioned disadvantages by providing a solar collector provided with a new convection and heat radiation suppressing structure, which simultaneously with excellent heat insulation and high sunlight transparency is simple to apply and replace, which does not require flatness or parallelity neither of the absorber surface nor of the window, and which in addition is easy and inexpensive to manufacture. Such a solar collector has the feature given in the subsequent claims and is described further hereinafter.

According to a basic concept of the invention the solar collector—which otherwise may be of a per se conventional type—comprises an insert placed in the interspace between the absorber surface and an outer transparent cover, which insert has the form of an essentially self-supporting structure comprising at least two layers of thin, wrinkled (i.e., corrugated) or corrugated foils of a transparent material, arranged one on top of another (i.e., contiguous) so that adjacent foils define a system of long and narrow ducts extending substantially along the absorber surface. Possibly, a plane, i.e. not wrinkled, foil is placed between one or more of the wrinkled or corrugated foils. Said wrinkled foils on top of each other may have their ridges extending in the same direction and thereby be said to have the same longitudinal wrinkle orientation, or at an angle with each other, and thereby be said to have different longitudinal wrinkle orientations. An example of the latter arrangement would be one in which the ridges of two adjacent foils are perpendicular to each other. Further, the wrinkled foils may be combined with plane foils in various ways, e.g. with a completely plane foil between each pair of wrinkled foils, such that a structure of wrinkled foil, plane foil, wrinkled foil, plane foil etc. is obtained. Also other combinations are, of course, possible, such as wrinkled, wrinkled, plane, wrinkled, plane etc. A suitable angle of the V-formed wrinkles from the viewpoint of reflection is about 20°–60°, preferably about 25°–40°, an angle of about 30°–35° being particularly advantageous.

The convection and heat radiation suppressing structure obtained by joining together wrinkled, and possibly, plane foils as above may be placed in the solar collector between the absorber and an outer transparent cover, which may comprise one or more glass or plastic panes, or combinations thereof. When said transparent cover consists of several plane-parallel sheets, such foil structures may be placed in the interspace between two or more or these sheets. In case of so-called naked or bare absorbers, i.e. lacking a conventional transparent cover, the structure may be placed directly on the absorber. In such a case the outermost foil may be thicker than the others and preferably plane.

Thanks to the duct system defined by the interspaces formed between the foils an effective convection suppression is obtained, even when great temperature differences (e.g. 50–150° C.) exist between the two sides of said structure. By having the ducts extending along the absorber surface, instead of perpendicularly thereto as in the prior art, they may easily be sealed against the sides of the solar collector, and neither need the absorber surface be plane nor the window or transparent cover be completely parallel thereto in order to obtain a good heat insulating effect.

The sunlight transparent foils of the above described structure should be of such a heat resistant material that they can stand a temperature of at least about 150° C. for a comparatively long time, and they should also stand sunlight radiation for a long time without degenerating to any greater extent through decomposition of discolouration. Among possible foil materials meeting the above requirements particularly those based upon cellulose acetates may be mentioned. Other possible materials include Polysulfone and Kapton. Each foil should transmit at least about 90% of the incident sunlight, and a suitable thickness is in the range from about 20 to about 100 $\mu$m, preferably from about 50 to about 100 $\mu$m. The "thickness" of the wrinkled or corrugated foils should preferably be in the range of about 3–30 mm, a range of about 5–15 mm being particularly preferred.

Since the purpose of the above foil structure is to reduce heat losses through convection and radiation, the contact between foil structure and absorber on one hand, and between foil structure and outer glass or plastic cover on the other, should be minimal, i.e. the heat transfer should be performed by the air in the interspace, not by the foil material. In solar collectors with a glass or plastic cover the outer limiting layers of the foil structure or structures should therefore be wrinkled or corrugated, which provides for minimal contact with the absorber and window material respectively.

In air-based solar collectors the convection and heat radiation suppressing structure may be arranged such that air passes through at least part of the structure. When higher temperatures of the air flowing through the solar collector are desired, it should, however, pass only along the absorber surface. In liquid based solar collectors 2-5 wrinkled or corrugated foils may be suitable, in view of the transmission losses, while in air based solar collectors considerably more than five foils, e.g. up to 20 foils, may be used. In the air type collectors the inner sheets of the foil structure may be blackened or otherwise suitably coloured, while the outer sheets are clear. Of course, also all the foil sheets or layers may be suitably coloured or gradually darker from the outermost layer, and the foil structures may be uncovered or covered by a glass or plastic pane or the like. The appropriate number of foils of the structure is naturally also affected by using coloured foils.

The above foil structure may also be used in combinations of air and liquid based solar collectors, wherein liquid is permitted to pass through the lower duct layers of the structure, and air through the upper layers.

Figure 2:
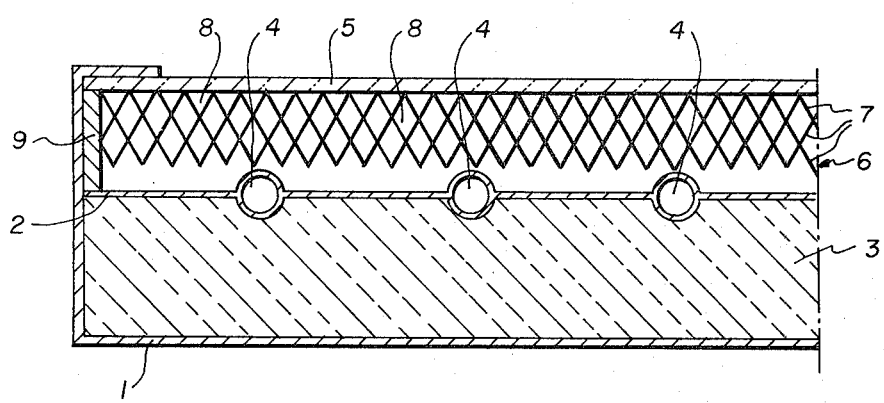
Figure 3:
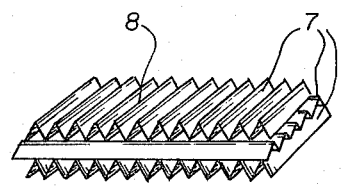
Figure 4:
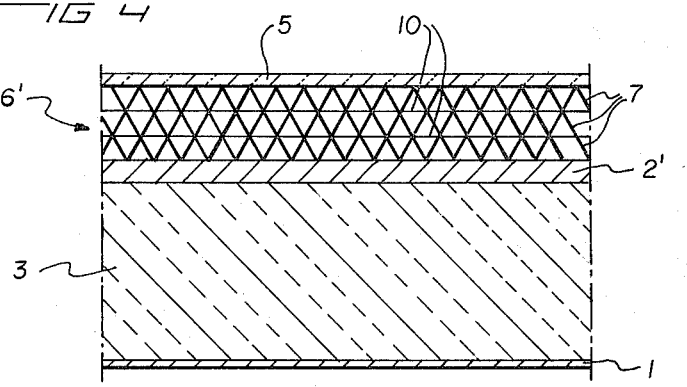

The invention is described in more detail hereinafter, for the purpose of illustration only, with regard to some special, non-limiting embodiments, reference being made to the accompanying drawing, wherein FIG. 1 is a perspective view of a part of a convection and radiation suppressing structure of the prior art, which has been discussed above, FIG. 2 is a schematic partial sectional view of an embodiment of a solar collector according to the invention, FIG. 3 is a schematic perspective view of a part of another embodiment of the convection and radiation suppressing structure of the solar collector in FIG. 2, and FIG. 4 is a schematic sectional view of another embodiment of a solar collector according to the invention.

The flat solar collector of FIG. 2 comprises in conventional manner a box-like casing 1, in which an absorber 2 is placed on a bed of insulating material 3, e.g. mineral wool, polyurethane or the like. In the case shown the absorber 2 comprises a plurality of tubes or ducts 4, designed to be passed by a heat carrying liquid. The absorber material may in conventional manner be copper, aluminum etc., and the surface is suitably provided with a thin coat of mat black colour. The surface may also be provided with a selective coat having a very low infrared emission, e.g. by oxidation of the surface of a copper absorber to $Cu_2O$. The absorber 2 is protected by means of a glass or plastic pane 5. Between the absorber 2 and the glass or plastic pane 5 a convection and radiation suppressing structure 6 is arranged. The structure 6 is built up by a number (in FIG. 2 three) of wrinkled foils 7 of a sunlight transparent material placed on top of each other. The foil structure may be obtained by wrinkling or corrugating thin foils of a suitable heat resistance material, e.g. cellulose acetate, i.e. acetylated cellulose, having a thickness of 20-100 $\mu$m, and gluing them together on top of each other, either with the ridges extending in the same direction and with the ridges of an underlying foil contacting the "valleys" of an overlying foil substantially along the whole length thereof, or such that the ridges of adjacent foils are at angles with each other. In the latter case the foils 7 may for instance be placed with the wrinkle directions of adjacent foils at right angles to each other, as is shown in FIG. 3. The foil structure 7 will then contain a number of long narrow ducts 8 extending substantially in parallel to the absorber surface 2. In the duct system formed convection is strongly suppressed, even if the temperature difference between the two sides of the structure is great, e.g. 50°-150° C. The structure obtained by joining foils on top of each other as above may be arranged in various ways in the solar collector. For example, when the wrinkles of the foils 7 do not form an angle with each other, the structure 6 may be arranged such that the ducts 8 formed extend in parallel to or perpendicular to the sides of the solar collector, or form any other angle with the sides of the solar collector. Likewise, if the wrinkle directions of adjacent foils 7 are at angle with each other in the structure, the latter may be arranged in the solar collector in any suitable manner. Suitably a piece 9 of insulating material is placed between the sides of the solar collector and the foil structure 6 to improve the sealing thereof against the sides and, possibly, support the window 5. A suitable foil structure 6 having wrinkled foils, normally from 2 up to 17, which are arranged as in FIG. 3, is commercially available under the trade name Isoflex (marketed by Isoflex AB, Uppsala, Sweden). This structure has a foil thickness of about 35 μm wrinkle nose angles of about 45°–50° and a wrinkle height of each foil of about 6 mm. The foil material is based upon cellulose acetate, is heat resistant, so that it can stand a temperature of at least 150° C. for a long time, and each foil transmits at least 90% of incident sunlight. Said foil also will stand exposure to sunlight for at least 15 years without degenerating or discolouring. A solar collector according to FIG. 2 may readily be obtained by, in a conventional solar collector having an interspace between the absorber surface 2 and the glass or plastic cover 5, inserting a suitably sized plate or sheet of the Isoflex structure having a desired number of foils into the interspace, said structure having a close fit to the collector sides. Hereby the heat losses from the solar collector through radiation and convection are heavily reduced, while losses of incident radiation through reflection and absorption in the structure are low. The net result is thus a considerably improved solar collector, having better performance than for example a conventional double glass solar collector, and being less expensive to manufacture. In spite of the fact that the absorber surface 2 in FIG. 2 is not plane due to the liquid tubes 4, convection between the air layer closest to the absorber and the glass 5 is nevertheless efficiently prevented, even if the uppermost foil layer 7 of the structure 6 would not contact the glass 5. The structure may be slightly pressed against the absorber 2 and against the glass or plastic pane 5. By the fact that the structure 6 in such a case is making contact with the whole absorber surface 2 and the whole glass surface 5, also relatively flexible materials, which otherwise would not stand any greater loads in the form of snow pressures etc., may be used as the outer transparent cover. Through the suppression of convection and heat radiation the temperature of the surface in contact with the ambient air will be kept low, and consequently also not particularly heat resistant materials may be used as said transparent cover. This would be impossible without the foil structure 6, since in extreme cases (if the fluid flow cooling the absorber is stopped) the heat transfer from the absorber would make a plastic pane soften and deform permanently.

A considerable advantage of the self-supporting structure 6 of the invention is that it may easily be inserted into the solar collector and need not be fastened thereto. It can therefore easily be taken out to be replaced.

In the solar collector of FIG. 2 it is, of course, also possible to have air passing between the absorber surface and the bottom foil 7, and possibly also through the rest of the structure 6. In the latter case, however, the foils should preferably be arranged with their ridges in either the longitudinal or transversal direction of the solar collector.

The structure 6 of wrinkled foils 7 may also be constructed with a plane foil between one or more of the wrinkled foils, as is schematically shown in FIG. 4. The convection and radiation suppressing structure 6' is in FIG. 4 constructed of three wrinkled foils 7 with two intermediate plane foils 10. The particular solar collector shown has a flat absorber 2' and is designed to emit heat to air passing through at least the bottom portion of the structure 6'. To this end the duct layer or layers to be passed by the air should extend in a side direction of the solar collector. In such an air based solar collector the air leaving the same may easily be distributed for different heating purposes, e.g. such that air passing nearest to the absorber surface, and therefore is warmer, is used for one purpose, while air passing through the upper, cooler layers are used for another purpose.

As mentioned above the build-up of the wrinkled foil structure may be varied in many various ways. Thus, wrinkled and plane foils may also be arranged in e.g. the order wrinkled, wrinkled, plane, wrinkled, wrinkled, plane, etc. Further it is not necessary to use any outer glass or plastic cover, the uppermost foil then possibly being thicker than the other foils and preferably plane.

Even if the invention has been described above the reference to plane solar collectors, the above described foil structure may, of course, also be used in curved, as well as whole or half-cylinder shaped solar collectors. Many additional modifications and variations of the embodiments described and shown above may naturally be performed without departing from the inventive idea, as disclosed in the subsequent claims.

We claim:

1. In a solar collector comprising a solar radiation absorbing surface means for transferring heat from the absorbing surface to at least one heat carrying fluid, a transparent cover spaced apart from the absorbing surface, and a convection and heat radiation suppressing structure positioned between the absorbing surface and the transparent cover, the improvement comprising, said convection and heat radiation suppressing structure being substantially self-supporting and comprising at least two thin, corrugated transparent foils numbering in a range of from 2 to about 20 foils placed adjacent to and on top of each other, such that adjacent foils define between themselves a system of long narrow ducts extending parallel to the absorbing surface, with the corrugations of adjacent foils extending at substantially right angles to each other; said means for transferring heat comprising at least one tube in heat exchange contact with the absorbing surface, said at least one heat carrying fluid comprising a liquid passing through said at least one tube, and/or a gas passing through the ducts of said foil structure.

2. A solar collector according to claim 1, wherein the suppressing structure includes at least one thin, transparent planar foil between at least two adjacent corrugated foils of said structure.

3. A solar collector according to claim 1, wherein the foils have a thickness of from about 20 to about 100 microns.

4. A solar collector according to claim 2 or 3, wherein the foil material is based upon cellulose acetate.

5. A solar collector according to claim 4, wherein the height of the corrugations of the corrugated foils is in the range of about 3 to about 30 mm.

6. A solar collector according to claim 1, wherein the foil material is based upon cellulose acetate.

7. A solar collector according to claim 1, 2, 3 or 6, wherein the nose angle of the corrugations of said corrugated foils is in the range of from about 20 to about 60°.

8. A solar collector according to claim 7, wherein the height of the corrugations of the corrugated foils is in the range of about 3 to about 30 mm.

9. A solar collector according to claim 1, wherein the absorbing surface has a coating of wave length selective absorbing material.

* * * * *